INVENTOR.
JAMES A. CHARLES
BY Richardson B Farley
ATTORNEY

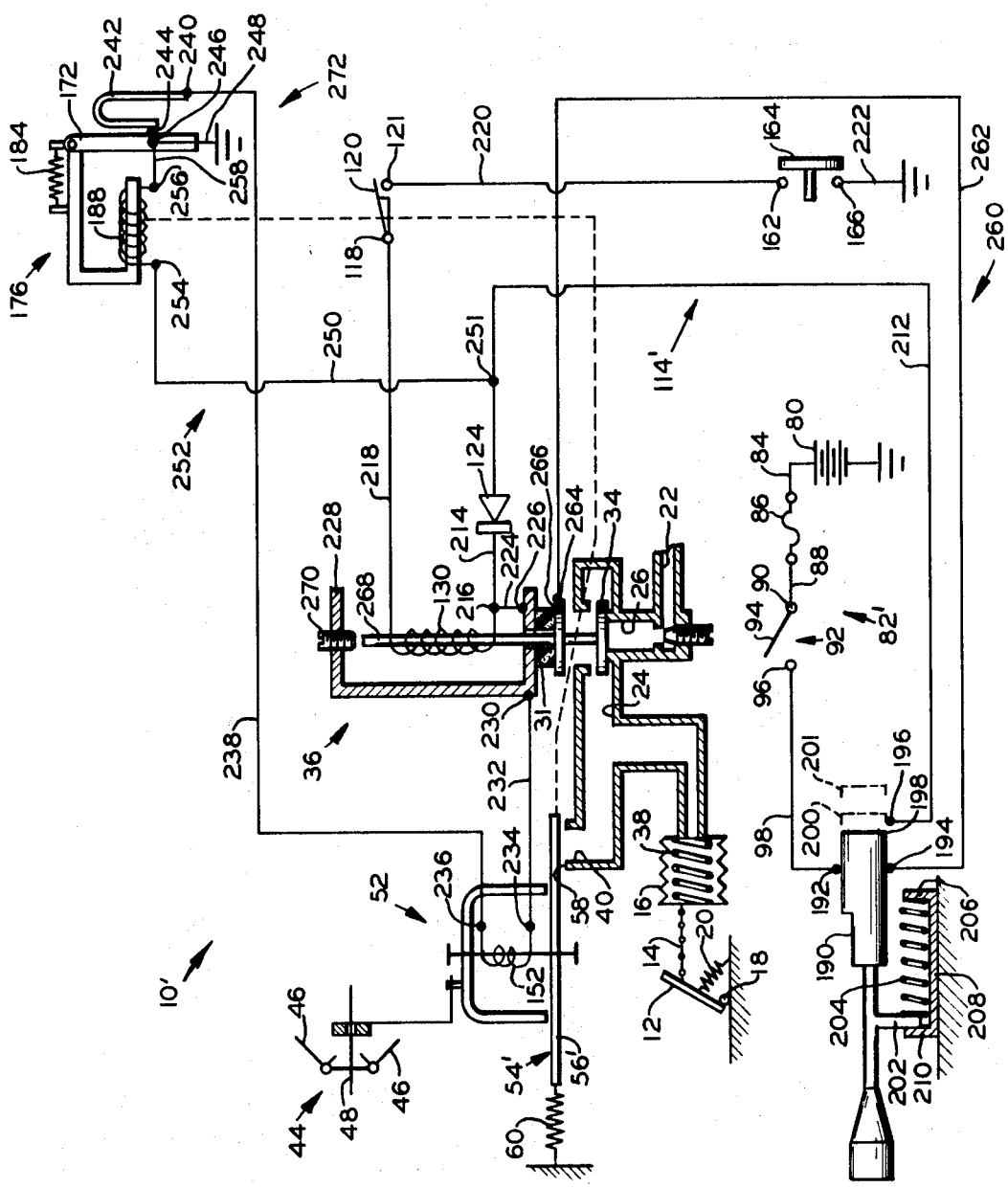

United States Patent Office 3,605,936
Patented Sept. 20, 1971

3,605,936
SPEED CONTROL WITH ADVANCE FEATURE
James A. Charles, Greens Fork, Ind., assignor to
Dana Corporation, Toledo, Ohio
Filed May 16, 1969, Ser. No. 825,285
Int. Cl. B60k 31/00
U.S. Cl. 180—108          20 Claims

ABSTRACT OF THE DISCLOSURE

A speed control system is provided which utilizes manifold vacuum pressure, as modified by atmospheric pressure, to control an engine throttle and thereby maintain an automotive vehicle at a desired speed. The speed control system includes an electro-magnetic means and a control circuit interrupting means for providing the speed control system with advanced speed actuation. Once a new speed has been obtained the speed control system may again be placed in speed controlling mode.

---

This invention relates generally to speed control systems and more particularly to an improved speed control system which offers a simplified yet positive throttle advance feature.

Although prior speed control systems have been devised which utilize manifold vacuum pressure modulated by air pressure for speed control and these same speed control systems additionally also offer throttle advance by the speed control system, none of these systems provide for extremely quick response and, at the same time, also include circuitry and structure details of as simplified a design as the instant invention.

For example, United States Pat. 3,410,361, owned by a common assignee, discloses a speed control system having an electro-mechanical arrangement that utilizes manifold vacuum, as modulated by atmospheric pressure, to control vehicle speed. A throttle advance feature is included in this speed control system by the provision of an atmospheric air supply controlling means and interlocking circuitry which interrupts speed control while the advance function is taking place. Although this system operates very satisfactorily, because of the provision for the advance function of additional operating elements for controlling the supply of atmospheric air pressure, the electrical circuitry to actuate these operating elements and the interlocking circuitry required for interruption of control, a fairly complex arrangement is required. Because of this complexity, this system is often too expensive for many vehicular applications.

Accordingly, it is an object of the instant invention to provide a simplified speed control system providing positive speed control and also throttle advance.

It is an additional object of the invention to provide a speed advance feature for a speed control system wherein speed advance is positively accomplished by movement of a modulating valve which monitors the pressure supplied to a throttle operating bellows.

It is a further object of this invention to provide a speed control system providing for positive throttle advance which is switch actuated by the vehicle operator.

It is a further object of this invention to provide a speed control system having manual speed settings for vehicle speed maintenance.

It is a still further object of this invention to provide a speed control system having a throttle advance feature which is extremely quick in response and yet a speed control system that is relatively inexpensive in manufacture.

In the aforementioned United States Pat. 3,410,361, an electro-mechanical device is provided that utilizes three basic components to provide speed regulation; these are, a regulator means, a servo means and an electrical circuitry arrangement for actuating the various electro-mechanical components. The regulator means senses speed through a speedometer cable or cable attached to the transmission or the like and feeds vacuum pressure, modulated by atmospheric pressure, to the servo means which controls engine throttle setting. The regulator means includes a solenoid valve means that opens and closes to permit the application of vacuum pressure to the servo means which in the aforesaid patent takes the form of a bellows. A modulating valve is also supplied as a portion of the regulator means; this valve controls the bleed of atmospheric air pressure to the servo means and is adjusted by a coupling coil link connected to a fly-ball governor that senses vehicle speed. The electrical circuitry includes means for actuating the solenoid valve and coupling coil so that the device can be locked in at the desired speed and also includes means for deactivating the coupling coil so that a new controlled speed can be reached.

The foregoing description of the speed control system of United States Pat. 3,410,361 applies exactly to the instant invention, the difference between these speed control systems residing in the operating components providing for advance and the electrical circuitry controlling the speed control system.

In one embodiment of the instant invention, an electrically energized magnet is provided in close proximity to a magnetizable projection on the modulating valve. When energized, this magnet causes the modulating valve to move to non-atmospheric air supplying position thereby providing additional movement of the vacuum actuated servo bellows in a throttling advancing direction. The electrical circuit arrangement is such that, upon energization of the electrically energized magnet, the coupling coil for the modulating valve is placed in a non-energized condition freeing the modulating valve for movement to this non-atmospheric air supplying position. After a new desired speed is reached, the coupling coil is re-energized and the vehicle speed modulated by the speed control system.

In another embodiment of the instant invention; an electrically energized magnet is provided to attract a pivoting lever that physically moves the modulating valve to an advance or close non-atmospheric air supplying position. Again, the electrical circuit arrangement provides for disengagement of the coupling coil during the throttle advance movement.

Other objects and advantages of this invention will be readily apparent from a reading of the following description and a consideration of the related drawings wherein.

FIG. 3 is a schematic illustration of an alternate embodiment of a speed control system incorporating the objects and advantages of the instant invention.

Figure 1:
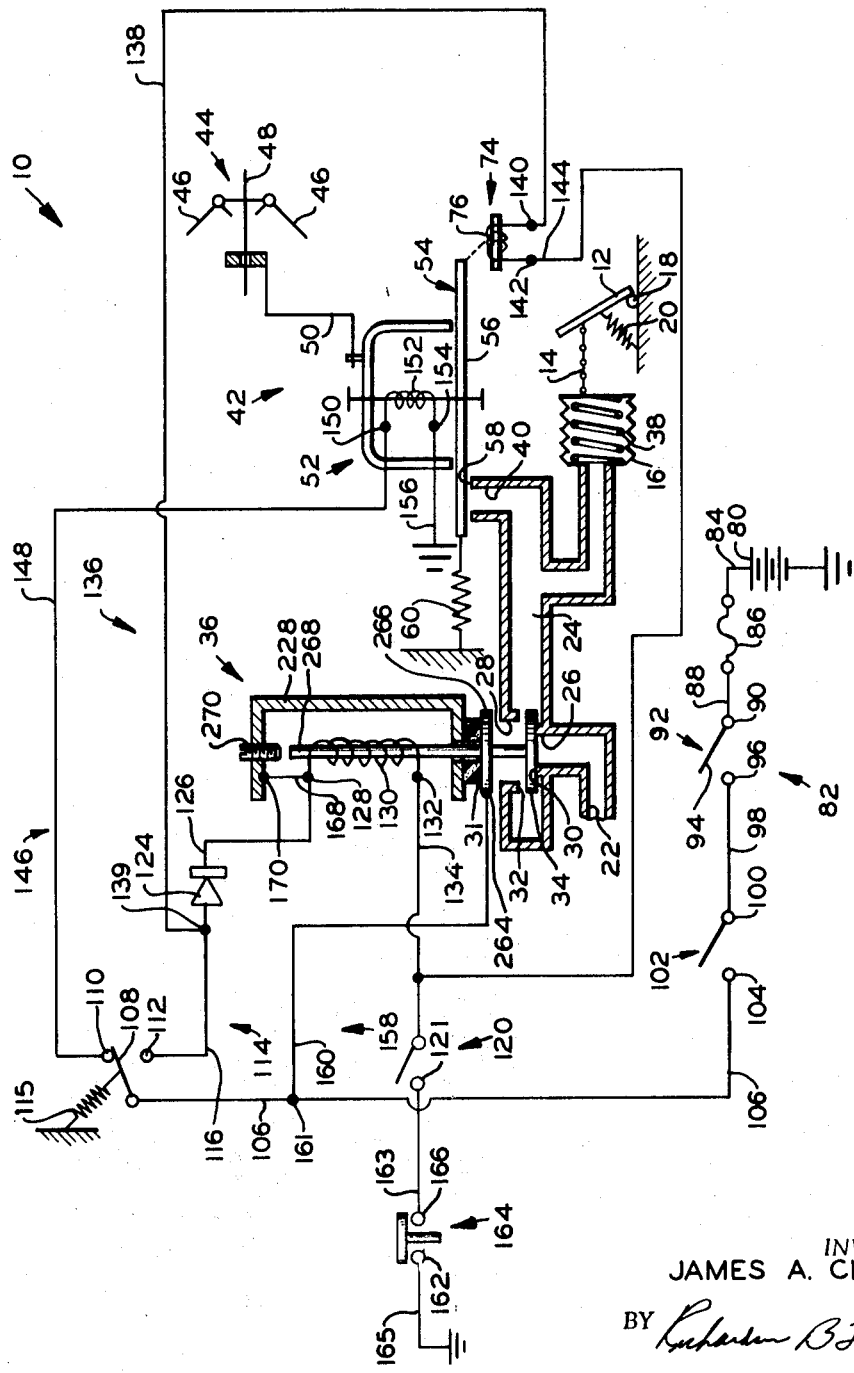
FIG. 1 is a schematic illustration of a speed control system incorporating the precepts of the instant invention.

A speed control system 10, embodying the instant invention is schematically illustrated in FIG. 1. It is preferably installed in a vehicle to control a vehicular engine through a throttle lever 12 and any one-way linkage such as a bead chain 14, connecting the throttle lever 12 to a servo motor in the form of a bellows 16 of the speed control system 10. The throttle lever 12 is mounted at its lower end on a pivot 18 and connected by suitable linkage (not shown) such that counterclockwise movement of the throttle lever advances the carburetor setting while clockwise movement of the throttle lever retards such setting, with the throttle lever 12 being biased in this clockwise direction to its maximum retard or idle position by a return spring 20. The bead chain 14, upon collapse of the bellows 16, pulls the throttle lever 12 against the bias of spring 20, while the throttle lever, because of the one-way effect of the bead chain, may advance counterclockwise beyond the position dictated by the servo bellows in response to other forces, such as the operator of the vehicle manipulating the gas pedal (not shown).

A supply line 22 is adapted to be connected to a suitable fluidic source. In the embodiments shown herein the fluidic source is contemplated as being a supply of negative pressure such as the intake manifold of an internal combustion engine (not shown) and, thereby, the components of the system 10 are adapted for vacuum utilization, it being understood that other fluidic means can be utilized with suitable modification of the components of the speed control system 10. A second supply line 24 is connected to the supply line 22 by a port 26, with the supply line 24 confluently connected to the servo bellows 16. Thus, upon vacuum being supplied to the bellows 16 through the supply lines 22 and 24, the servo bellows will collapse pulling bead chain 14 in a throttle advancing direction to the left.

The supply line 24 is also provided with a port 28 aligned with the port 26, which port is adapted to admit atmospheric pressure into the line 24. The ports 26, 28 are provided with valve seats 30, 32, respectively, on either of which a plunger 34 of a solenoid valve 36, disposed in supply line 24, may seat. When the plunger 34 engages the seat 32, vacuum or negative pressure is supplied through the supply line 22 and through the port 26 to the supply line 24 and, through the latter to the bellows 16; the plunger 34, at this time, since it is seated on valve seat 32, prevents the admission of atmospheric air through the port 28 to the supply line 24. When the plunger 34 is urged into seated condition against the valve seat 30 by an elastomeric spring 31, negative pressure in the supply line 22 is blocked from passage into supply line 24, and, since the port 28 is open at this time, atmospheric pressure is supplied therethrough to the supply line 24 and through it to servo bellows 16.

The bellows 16 may be provided with a return spring 38 which returns the bellows to its expanded condition upon the supply thereto at atmospheric pressure, so that the bellows 16 no longer pulls the bead chain 14 to the left. Alternately, the return spring 38 may be omitted and the spring 20 utilized to expand the bellows by means of the connection of this spring with the bellows through the throttle lever 12 and bead chain 14.

The supply line 24 is also provided with a port 40 which is adapted to bleed air from the atmosphere into the supply line 24 while a regulator means 42 is adapted to modulatingly control the flow of atmospheric air into the supply line 24 through the port 40. The regulator means 42, when activated, is responsible to vehicle velocity in modulating the aforementioned supply of air to its supply line and thereby maintains the servo bellows 16 and the throttle lever 12 in the proper position for the desired set speed.

The regulator means 42 includes a fly-ball governor 44 which has a pair of opposed pivoted weights 46, 46, with each of the weights having a generally L-shape. Upon rotation of a shaft 48 on which the weights 46, 46 are pivoted, this shaft being driven by connection to the speedometer cable (not shown) or the like the weights 46, 46 pivot outwardly and move an attached linkage 50 in proportion to the speed the vehicle is actually attaining. The linkage 50, in turn, is connected to and drives a pivoted controllable coupling means 52 which may be magnetically coupled to a modulating valve means 54.

The modulating valve means 54 (FIG. 2) includes a valve plate 56 seated on a valve seat 58 provided around port 40. The valve plate 56 may, by rotation, open, close or partially close the port 40 thereby providing the aforesaid modulating atmospheric air pressure to supply line 24. The valve plate 56 is urged to a generally centralized position (port 40 slightly open) by a centering spring 60 attached to the valve plate 56 so that, in unactuated condition, the valve plate 56 is in equilibrium position. The centering spring 60, of course, extends from the valve plate 56 so that its other end is fixed relative to the movable valve plate 56.

Figure 2:
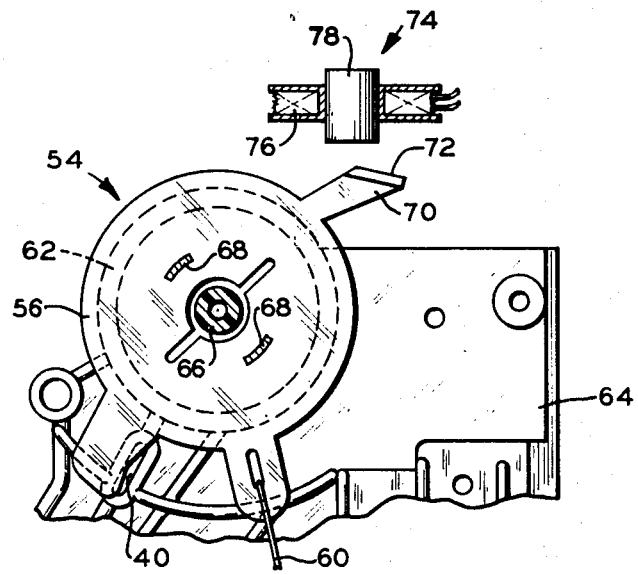
FIG. 2 is a plan view of the modulating valve and related structure.

Insofar as related, the detailed description of the embodiment of the invention illustrated in FIGS. 1 and 2 is exactly similar to the speed control system of FIGS. 1–5 of United States Pat. 3,410,361. The electro-mechanical elements and their arrangement in the instant embodiment may, in fact, be exactly similar to the electro-mechanical elements and their arrangement in the device shown in FIGS. 1–5 of the said patent save for two differences; these are, there is no solenoid for monitoring atmospheric air flow (solenoid 174 of FIG. 3 of the said patent) and the arrangement of the valve plate 56 and its surrounding structure is considerably altered over that disclosed in FIG. 4 of the patent. The control circuitry for the speed control system 10 is also revised to accommodate these changes. A more detailed explanation of the first embodiment follows:

Referring more specifically to FIG. 2, it can be seen that the valve plate 56 is disposed in a centered position over port 40 so that there is a constant bleed of atmospheric air pressure therethrough to the bellows 14 when the speed control system 10 is in an inactive position. The valve plate 56 is preferably formed of a plastic material that is freely slidable on a bearing surface 62 formed as a part of a housing 64 that encloses the speed control system 10, the valve plate 56 pivoting on a post 66 fixed to this same housing. A series of lugs 68, 68 extending from a metallic plate (not shown) connect valve plate 56 thereto so that the valve plate 56 may be magnetically coupled to controllable coupling means 52 (FIG. 1). A tab portion 70 which is integral with valve plate 56 extends generally radially outwardly from the main portion of valve plate 56 so as to provide a convenient mounting means for a magnetic element 72 which may consist of a metal plate attached by adhesive or the like to the tab portion 70.

An electrically energizable magnet 74 is mounted in the housing 64 so as to be situated in close proximity to the tab portion 70. This magnet includes a conventional wire coil 76 and a core member 78 which is capable of attracting magnetic element 72, when energized, to move valve plate 56 counterclockwise against the tension of centering spring 60. Upon such counterclockwise movement, port 40 is closed by valve plate 56 and atmospheric air pressure is prevented from flowing in supply line 24.

Turning again to FIG. 1, wherein the operative elements and electric circuitry of the speed control system is shown schematically, it is seen that a grounded battery 80, which may advantageously be the vehicular battery, supplies an electric power supply for control of the speed control system 10. Tht battery 80 is included in a supply circuit means 82 having a lead 84 extending from the battery 80 to a terminal of a fuse 86. A lead 88 extends from the opposite terminal of fuse 86 to a contact 90 of a switch 92, with a blade 94 of the said switch, in closed position, being in electrical connection with a contact 96 of the switch 92. The switch 92 may conventionally take the form of the ignition switch of the vehicle so that activation of this switch provides a power supply for the speed control system 10.

A lead 98 extends from the contact 96 of ignition switch 92 and provides an electrical connection with a contact 100 of an on-off switch 102 for the speed control system 10. This switch may for example, be mounted on the vehicular dashboard or, alternately, in the turn signal lever so as to be convenient for the vehicle operator's use. The on-off switch 102 includes an opposite contact 104 with a lead 106 electrically connected to this contact and extending towards a control switch blade 108 which is provided to be actuated for speed advance or speed set an lock in.

Control switch blade 108 is capable of contacting, alternately, a pair of contacts 110 or 112 with each of these contacts forming the beginning of separate circuit for current flow within the speed control system 10. A spring 115 normally urges the switch 108 into closed relationship relative to contact 110, but manual effort is sufficient to provide a closed relationship between this switch blade and contact 112. By this arrangement current may alternately be supplied to either of contacts 110 or 112 but not to both simultaneously.

Contact 112 is included in and forms a portion of a solenoid actuating circuit means 114 with a lead 116 of this circuit extending from contact 112 to be in electrical connection with a silicon diode 124. This silicon diode is a one-way valve in a manner to be later described. A lead 126 extends from an opposite terminal of the silicon diode 124 to make an electrical connection with a contact 128 which, in turn, is attached to a solenoid coil 130 of vacuum solenoid valve 36. The opposite end of the solenoid coil is grounded through its contact 132 and a lead 134 which is in electrical connection with a low speed switch 120. This switch is arranged so as to be normally closed once the vehicle has attained a speed of, for example, twenty-five miles per hour so that it is then placed in a current carrying condition to provide for the flow of electricity from one contact 121 of it to a lead 163. The lead 163 extends to and is in electrical connection with a brake switch 164, this switch having its contacts 162, 166 in electrical connection as long as the vehicular brake (not shown) is not actuated by the operator. This circuit is completed to ground by a lead 165. By the actuating circuitry just described, it should be clear that movement of the switch 108 into a current carrying condition with the contact 112 causes actuation of solenoid valve 36 to a position where its plunger 34 moves against seat 32, providing a vacuum supply for servo bellows 16 through supply conduits 22 and 24. This actuation occurs by a current flow from power supply circuit 82 into contact 112, through lead 116, silicon diode 124, lead 126, contact 128, solenoid coil 130, contact 132, low speed switch 120, brake switch 164 and lead 134 to ground.

An advance circuit means 136 is formed by a branch lead 138 which is in electrical connection with lead 116 at a junction 139 situated between contact 112 and silicon diode 124. Branch lead 138 extends from this junction to a contact 140 which, in turn, is in electrical connection with coil 76 of energizable magnet 74. This circuit is completed to ground by a contact 142 of coil 76 and a lead 144 that extends to and connects to lead 134 so that current to ground must flow through low speed switch 120 and brake switch 164. By this circuitry, when contact 112 is placed in a current carrying condition by control switch blade 108, an electrical flow path is formed through a portion of lead 116, junction 139, lead 138, contact 140 coil 76 of energizable magnet 74, contact 142, lead 144, low speed switch 120, and brake switch 164 to ground. As set out previously, such a flow of electricity energizes core member 78 of energizable magnet 74 and moves valve plate 56 to close off atmospheric air pressure from port 40.

A coupling coil actuating circuit 146 is also provided. This circuit includes contact 110, connectable to control switch blade 108, which contact is in electrical contact with a lead 148 extending to a contact 150 of controllable coupling means 52. A coupling coil 152 of the coupling means 52 is electrically attached to this contact and also to a contact 154. A lead 156, in turn, extends from the contact 154 to ground. A flow path for electricity is thereby formed from the contact 110, through lead 148, contact 150, coupling coil 152, contact 154 and lead 156 to ground. Thus, actuation of control switch blade 108 in the proper direction to place contact 110 into current carrying relationship actuates coupling coil 152 thereby locking valve plate 56 thereto so that the position of valve plate 56 relative to port 40 is dictated by the fly-ball governor 44.

A solenoid valve holding circuit 158 completes the control circuitry for the speed control system 10. This circuit includes a branch lead 160 extending from and electrically connected at junction 161 to lead 106 of power supply circuit 82. Lead 160 extends to and is electrically connected to a contact 264 mounted on a conductive flange 266 of solenoid valve 36. Current flows from this conductive flange to an armature 268 of solenoid valve 36 and from thence to an adjusting screw 270, the armature 268 contacting this adjusting screw when the solenoid valve 36 is in its upper position. A contact 170 on solenoid frame 228 then feeds current into a lead 168 which is in electrical connection with contact 128. With the solenoid valve plunger 34 in its vacuum supplying (upper) position, contact 170 is thereby electrically connected to contact 128 of solenoid valve coil 130. An electrical flow path is thus formed from power supply circuit 82 to junction 161, branch lead 160, contact 264, conductive flange 266, armature 268, adjusting screw 270, solenoid frame 228, contact 170, lead 168, vacuum solenoid coil 130, contact 132 and lead 134 to ground through low speed switch 120 and brake switch 164.

The entire operation of the speed control system 10 can then be detailed as follows. Once the vehicle has attained a speed above twenty-five miles per hours so that low speed switch 120 is in current carrying condition and the on-off switch 102 has been moved to on position either speed set or speed advance may be obtained by proper manipulation of switch control blade 108. It should be noted that switch control blade 108 is normally maintained by a spring 115 in a position where contact 110 is in electrical connection with supply circuit 82. With the switch 108 in this position, current is provided to actuate coil 152 of controllable coupling means 52 through lead 148 but this actuation of the controllable coupling means 52 in no way affects speed control since no vacuum pressure is being supplied to servo bellows 16 at this time since solenoid valve 36 is in the position where port 26 is closed.

To obtain speed set, the vehicle is accelerated to the desired speed and the switch control blade 108 actuated manually, momentarily, to place contact 112 in current carrying condition. Current then passes into solenoid actuating circuit 114 through lead 116, one-way current passing silicon diode 124, lead 126 and solenoid coil 130 to ground. This actuation moves solenoid plunger 34 into vacuum supplying position away from port 26 and provides vacuum bellows 16 with vacuum pressure.

At the same time as solenoid actuating circuit 114 is placed in active condition advance circuit 136 is energized through lead 138. This energizes magnet 74 and tends to urge valve plate 56 in a throttle advancing direction (urges the valve plate 56 to a closed position over port 40). However, since movement of the switch blade 108 to place the contact 112 in current carrying condition is only momentary for speed set, insufficient time is provided for the throttle lever 12 to react to the imposition of full vacuum pressure from the supply conduits 22 and 24.

The switch blade 108, at this time, has placed contact 110 out of a current carrying condition so that the controllable coupling means 52 is not energized and therefore disengaged. As soon as switch blade 108 is permitted to return to its normal position as urged by spring 115 coupling coil 152 of coupling means 52 is placed in energized condition through the lead 148 thereby coupling the valve plate 56 to the fly-ball governor 44. Immediately prior to this coupling, the spring 60 tends to center the valve plate 56 (place it in equilibrium condition) since the magnet 74 is no longer electrically energized. Thus, the controllable coupling means 52 can now provide, through the fly-ball governor 44, a modulating effect on the atmospheric air pressure it supplies through the port 40 and this modulating effect will be directly proportional to vehicle speed.

De-energization of the contact 112 by return of the switch blade 108 to normal position interrupts the solenoid actuating circuit 114, however, a vacuum supply pressure is still provided through port 26 since actuation of the solenoid plunger 34 (upwardly) into vacuum supplying position placed the contact 128 of solenoid coil 130 into current carrying condition with the contact 170 of the solenoid valve holding circuit 158 so that current, through the lead 160 maintains the solenoid plunger 134 in the vacuum supplying condition and the speed of the vehicle is maintained, the valve plate 56 monitoring a proper air flow to permit sustained steady vehicular velocity operation.

During this sustained operation, with contact 128 and thereby contact 170 in current carrying condition, no current flow to coil 76 of magnet 74 occurs since current from contact 128 of solenoid coil 130 cannot pass backwardly through silicon diode 124 as it acts as a one-way valve. Speed advance can then only be obtained by movement of switch blade 108 into contact with contact 110.

In order to obtain throttle acceleration (speed advance) with speed control system 10 is only necessary to maintain switch blade 108 in position so that contact 112 is in current carrying condition for a sustained length of time. During such sustained period of operation solenoid actuating circuit 114 is again energized placing solenoid valve 136 in vacuum supplying position and providing a vacuum supply for servo bellows 16. The coupling coil actuating circuit 146 is de-energized by the aforementioned movement of switch blade 108 so that the controllable coupling means is not actuated. Advance circuit 136 is in actuated condition, however, through lead 138, so that magnet 74 urges valve plate 56 into a closed position over port 40 thereby limiting atmospheric air supply and placing a full vacuum on servo bellows 16 to urge the throttle lever 12 to advance the speed of the vehicle. When the desired speed of the vehicle has been reached through actuation of speed control system 10, switch 108 is permitted to return to its normal position as dictated by the spring 115 and the controllable coupling means 52 is thereby energized to maintain this speed, vacuum supply being continuously maintained by solenoid holding circuit 158.

Figure 4:
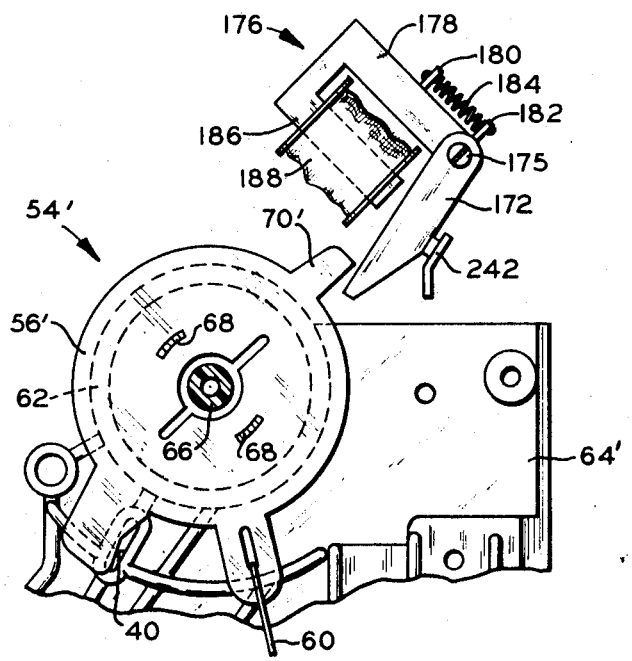
FIG. 4 is a plan view of the modulating valve and related structure of the instant invention.

The second embodiment of the invention is illustrated in FIGS. 3 and 4 and in these figures like numerals are used to denote elements which are like those elements already referred to relative to the first embodiment of the invention. Also, in a manner similar to the first embodiment, the electro-mechanical elements and their arrangement in the speed control system 10' are exactly similar to the electro-mechanical elements and their arrangement in the device shown in FIGS. 1 to 5 of the said patent save for two differences. There is no solenoid for monitoring atmospheric air flow (solenoid 174 of FIG. 3 of the said patent) and the arrangement of the valve plate 56' and its surrounding structure is considerably altered in this embodiment over that disclosed in FIG. 4 of the said patent. The control circuitry for the speed control system 10', of course, is also revised so as to provide for the changes relative to the arrangement of the valve plate 56' and its actuation.

Referring more specifically to FIG. 4, it can be seen that the valve plate 56' is disposed in a centered position by the spring 60 over port 40 so that there is a constant bleed of atmospheric air pressure therethrough to the servo bellows 16 when the speed control system 10' is in inactive condition. The valve plate 56' is preferably formed of a plastic material which is freely slidable on a bearing surface 62 formed as a part of the housing 64', this housing enclosing the speed control system 10'. The valve plate 56' is pivoted on a post 66 fixed to this same housing. A series of lugs 68, 68 extend from a metallic plate (not shown) to connect valve plate 56' thereto so that the valve plate 56' may be magnetically coupled to controllable coupling means 52. A tab portion 70' which is made integral with valve plate 56' extends generally radially outwardly from the main portion of valve plate 56' so as to provide an engaging means for engagement with a metallic pivoted foot 172, this pivoted foot being pivotally mounted on housing 64' by a pivot post 175, mounted in fixed relation to the housing.

A U-shaped element 176 is disposed between the foot 172 and the adjacent surface of the housing and fixed relative to that housing by any convenient means and includes a mounting for the pivot post 175 on an arm 178 of the U-shaped element 176. The arm 178 includes an integral tab 180 which extends perpendicularly to the general linear extent of arm 178. A tab 182 is also integrally attached to the pivoted foot 172 so as to extend from one end thereof to be disposed in opposite, confronting relationship to the tab 180. A resilient urging means in the form of an expansion spring 184 is disposed between and connected to the tabs 180 and 182, with this spring urging the pivoted foot 172 in a counterclockwise direction and thereby away from the tab portion 70' of the valve plate 56'. An opposite arm 186 of the U-shaped element 176 has mounted thereon an energizable electrical coil 188 which, when actuated, magnetizes arm 186 of the U-shaped element 176 to thereby attract pivoted foot 172 in a clockwise direction. Such movement of pivoted foot 172 places it in engagement with tab portion 70' of valve plate 56' and urges valve plate 56' to a position so as to close port 40 thereby limiting atmospheric air supply and providing a full vacuum supply to servo bellows 16 when the speed control system 10' is properly actuated.

Turning now to FIG. 3 for a fuller understanding of the invention and a somewhat more detailed illustration of the operative elements and electrical circuitry of the speed control system 10', it can be seen that the speed control system 10' is shown schematically. A power supply circuit 82' includes a grounded battery 80 connected to a lead 84 which extends to a contact of a fuse 86. A lead 88 extends from an opposite contact of fuse 86 and is electrically connected to a contact 90 of a switch 92. This switch may conveniently be the ignition switch of the vehicle and includes a switch blade 94 which, when closed, electrically connects contact 90 with a contact 96 of ignition switch 92. Extending from contact 96 is a lead 98, this lead having its opposite end connected to a contact 192 of a three position switch 190. Contacts 194 and 196 provide the other contact elements for the three position switch 190.

When switch 190 is in its normal position (indicated in full lines and denoted 198 in FIG. 3), contacts 192 and 194 are contacted by the switch 190 and an electrical path is established therebetween. When the switch 190 is depressed midway to its intermediate position, indicated by dotted lines and the reference numeral 200 in FIG. 3, contacts 192, 194 and 196 are placed in electrical conducting relation. When the three position switch 190 is in its fully depressed position (indicated by chain dotted line 201), contacts 194 and 196 are engaged by switch 190 and contact 192 is open. The switch 190 includes a flange 202 against which is abutted the left end of a compression spring 204, while the right end of this spring abuts a shoulder 206 carried by member 208 fixed stationarily relative to the switch. The spring 204 normally biases the left side of flange 202 against a shoulder 210, of member 208 to normally maintain the switch 190 in its full line position shown at 198.

A solenoid actuating circuit 114' extends from contact 196. It is formed by a lead 212 which is electrically connected to contact 196 and extends to a terminal on a one-way valve comprising a silicon diode 124. The opposite terminal of silicon diode 124 is connected to a lead 214 which, in turn, extends to a contact 216 on solenoid valve 36. Solenoid coil 130 of solenoid valve 36 is electrically connected to contact 216 at its one end and at its other end to a lead 218 that extends to and is in electrical communication with a low speed switch 120. This switch, as in the first embodiment, is designed so as to close when the vehicle speed or approximately 25 miles per hour is reached. A lead 220 extends from a contact 121 of low speed switch 120 and is electrically connected to a contact 162 of a brake switch 164. This brake switch is in normally closed position and only opens when the brakes of the vehicle are applied. A contact 166 is connected to an opposite contact 166 of the brake switch and is also connected to a lead 222 which extends to ground.

Electrical actuation of the vacuum supplying solenoid 36 occurs in the following manner. With the three position switch 190 in its intermediate position 200, an electrical current flow path is established between the contacts 192 and 196; flow is then through lead 212, silicon diode 124, lead 214 to contact 216 and thence through the solenoid coil 130, lead 218, low speed switch 120, lead 220, brake switch 164 and lead 222 and thence to ground. As the solenoid coil 130 is actuated, the plunger 34 of the vacuum solenoid 36 moves to its upper vacuum supplying position opening port 26 and providing a flow of vacuum through supply lines 22 and 24 to servo bellows 16.

When the switch 190 is in this same intermediate position, current also flows from the contact 216 through a lead 224 to a contact 226 mounted on a solenoid frame 228 of vacuum solenoid 36. A lead formed by the conductive solenoid frame 228 provides a path flow for current to a contact 230 mounted on the solenoid frame and from there through a lead 232 to a contact 234 mounted on the coupling coil 152. A contact 236, at the other end of the coupling 152, is electrically connected to a lead 238 that extends to a contact 240 on a switch blade 242 (see also FIG. 4). The switch blade 242 has mounted on one of its extremities a contact 244 that is normally in electrical connection with a contact 246 mounted on pivoted foot 172 when the said foot is in an unactuated (non-magnetically attracted) position. A lead 248 extends from the contact 246 to ground to complete flow path for electricity through the solenoid frame 228 and coupling coil 152. In this manner, current flows from the lead 212, through the one-way silicon diode 124 into the lead 214, contact 216, lead 224, contact 226, solenoid frame 228, contact 230, lead 232, coupling coil 152, lead 238, switch blade 242, contacts 244 and 246 and lead 248 and thence to ground.

Because of the arrangement of the circuitry just described and the fact that expansion spring 184 urges the pivoted foot 172 so as to place contacts 244 and 246 into electrical connection, momentary energization of the vacuum supplying solenoid circuit 114' causes energization of the coupling coil 152 thereby tending to lock in whatever vehicular speed has been attained at that time. However, at this same instant, electrical current is flowing through a lead 250 which is attached to lead 212 at a junction 251, the said lead 250 providing a portion of an advance circuit means 252. This circuit functions to actuate the movement of valve plate 56' to a position to prevent port 40 from attaining an atmospheric air supply so that supply lines 22 and 24 are rendered in a full vacuum condition. The lead 250 of advance circuit means 252 extends to and is connected to a contact 254 of magnetic coil 188 which, when energized, tends to provide the advance function. A contact 256 is attached to the other end of magnetic coil 188 and is electrically connected to a lead 258 that extends to and is in electrical connection with contact 246, this contact as previously mentioned being carried by pivoted foot 172. This circuit is completed to ground by lead 248. With the three position switch 190 in intermediate position, then, any tendency for the locking of coupling coil 152 of controllable coupling means 52 is prevented since this position of the switch 190 provides a flow of current through lead 212 to lead 250 to actuate coil 188 and move contacts 244 and 246 into a non-contacting position.

A holding circuit means 260 is provided extending from the contact 194 and includes a lead 262 extending to and connected to a contact 264 attached to a conductive flange 266 of the solenoid valve 36. Current flows from this conductive flange to an armature 268 of solenoid valve 36 and from thence to an adjusting screw 270, the armature 268 contacting this adjusting screw when the solenoid valve 36 is in its upper position. Current then flows through solenoid frame 228 into contact 226 and from thence to lead 224 and contact 216 of the solenoid coil 130. Current flow to ground is through lead 218, low speed switch 120, lead 220, brake switch 164 and lead 222. The arrangement just described provides a holding circuit for the armature 268 which maintains it in its upper position once actuated to this position and thereby places the vacuum solenoid 36 in full vacuum supplying position as long as contact 194 is energized.

During the operation just described no flow of current is provided for the magnetic coil 188, since current at contact 216 cannot flow backwardly through one-way silicon diode 124 to lead 250. Thus, actuation of holding circuit means 260 does not provide a consequent actuation of advance circuit means 252.

A coupling coil circuit 272 which magnetically locks coupling coil 152 to valve plate 56' is also provided. This circuit comprises solenoid armature 268, adjusting screw 270, a portion of solenoid frame 228, contact 230, lead 232, coupling coil 152, lead 238, switch blade 242 and lead 248 which completes the circuit to ground. This electrical path is insured unless advance circuit means 252 is actuated since the switch blade 242 is normally abutted by pivoted foot 172 because of the urging thereto by spring 184. At this time a flow of atmospheric air is permitted to flow to supply conduits 22 and 24 since the valve plate 56' has not been urged to a position wherein it closes port 40.

The overall operation of the speed controlling system 10' including manual speed set and speed advance will now be described. To manually set vehicle speed to the desired value the foot throttle or gas pedal of the vehicle is actuated until a desired speed is reached. This speed must be above the speed set for the low speed switch 120 so that this switch is closed thereby readying the entire system for speed regulation. At the desired speed, the three position switch 190 is momentarily depressed to its intermediate position (indicated by the dotted lines 200) closing contacts 194 and 196 so that power is supplied to the vacuum solenoid actuating circuit 114 and advance circuit means 252.

The armature 268 of vacuum solenoid 36 is urged, by the actuation of the circuit 114, into a vacuum supplying position putting the armature 268 into contact with the adjusting screw 270 and providing a negative pressure to the supply lines 22 and 24 and therefrom to the bellows 16. Since the armature 268 and adjusting screw 270 are in contact at this time, holding circuit means 260 is placed in an actuated condition so that the solenoid armature 268 is maintained in a vacuum supplying position until full circuit interruption occurs. The actuated advance circuit means 252 moves the pivoted foot 172 clockwise thus interrupting any flow of current to coupling coil circuit 272 and places the valve plate 56' in a position so that atmospheric air does not flow into supply conduit 24.

This momentary energization of advance circuit means 252 is insufficient to provide an over speed of the vehicle above the desired speed. Upon release of the switch 190, it moves outwardly thereby placing contact 194, alone, into current carrying condition, contact 196 at this time not being electrically connected to contact 192. Since circuit 252 goes to an unactuated condition, then pivoted foot 172 rotates counterclockwise placing it in electrical connection with switch blade 242 and closing and completing the coupling circuit 272 so that the valve plate 56' is coupled to the pivoted weights 46 and vehicle speed maintenance is insured.

In order to obtain speed advance the three position switch 190 is again placed in intermediate position (indicated 200) and maintained in this position for a sufficient amount of time for the vehicle to obtain the desired advance speed. During such time vacuum solenoid actuating circuit 114' is placed in electric current carrying condition, moving armature 268 into full vacuum supplying position. Holding circuit means 260 is also electrically energized to maintain the solenoid armature 268 in its vacuum supplying condition and advance circuit means 252 is actuated magnetically attracting valve plate 56' to a non-atmospheric supplying position, at the same time, coupling coil circuit 272 is not energized. Full vacuum on throttle bellows 16 moves throttle valve 12 advancing engine speed. At the desired advance speed, the three position switch 190 is permitted to move outwardly again to its full line position thereby maintaining electrical actuation of holding circuit means 260 and energizing coupling circuit means 272. Speed maintenance is thereby obtained.

In order to de-energize the speed control system 10' three position switch 190 may be moved to its most inward position (chain dotted lines) thereby breaking the electrical connection between contact 192 and three position switch 190. Such position switch 190 breaks the electrical flow path to either contacts 194 and 196 and thereby places the entire speed control system 10' in an unenergized condition. At such time vacuum is no longer being supplied to servo bellows 16 so that the vehicle, in the absence of a throttle actuation by the operator, tends to slow down as the throttle valve is moved to a retarded position by return spring 20.

It should be clear from the above description that a speed control system has been described which provides a novel and simplified arrangement for providing speed advance to a speed control unit and thereby fulfills the objects of the invention and also has all its intended advantages. However, it is to be understood that the specific construction described is only exemplary and many obvious modifications will appear to one skilled in the art in the practice of the foregoing invention.

What is claimed is:

1. A speed regulating system having a manual throttle lock-in and throttle advance including; (a) servo motor means for controlling an engine throttle setting, (b) pressure source means for supplying a negative pressure to said servo motor means, (c) solenoid valve means for alternately permitting and interrupting flow from said negative pressure source to said servo motor, (d) modulating valve means for imposing atmospheric pressure on said servo motor, (e) regulator means including a coupling coil for controlling the position of said modulating valve means, (f) magnetizable coil means for moving said modulating valve means for interrupting and permitting the flow of atmospheric air to said servo motor (g) an actuating circuit for moving said first solenoid valve means to a position for permitting the flow of said negative pressure to said servo motor, (h) a holding circuit for maintaining said first solenoid valve means in said negative pressure supplying position, (i) a coupling circuit connected to said holding circuit for magnetically locking said coupling coil to said modulating valve to place said regulating means in regulating condition, (j) a second actuating circuit for actuating said magnetizable coil means for moving said modulating valve means to atmospheric air flow interrupting position, (k) said sec- second actuating circut electrically connected to said first actuating circuit for simultaneous actuation thereof, (l) said second actuating circuit being connected to said holding circuit but electrically isolated therefrom by diode means to prevent feedback from said holding circuit and (m) a multi-position switch means for interrupting and providing current to said first actuating circuit and said second actuating circuit.

2. The combination set out in claim 1 wherein said first actuating circuit includes a one-way current passing means and said second actuating circuit is electrically attached to said first actuating circuit on the power supply side of said one-way current passing means.

3. The combination set out in claim 2 wherein actuation of said first and second actuating circuits opens said coupling coil circuit and disengages said modulating valve from said coupling coil.

4. The combination set out in claim 3 wherein a two position switch is provided and movement of said two position switch interrupts said coupling coil circuit.

5. The combnation set out in claim 3 wherein a pivoted foot means is provided and movement of said pivoted foot means interrupts said coupling coil circuit.

6. The combination set out in claim 3 wherein a three position switch is provided, one position of said switch placing all of said circuits in a non-energized condition.

7. The combination set out in claim 3 wherein a two position switch is provided, one of said positions placing said coupling coil circuit in energized condition, the other of said positions placing said first and second actuating circuits in energized condition.

8. A circuit for a speed regulating system including; (a) a vacuum solenoid actuating circuit, (b) a coupling coil circuit connected to said vacuum solenoid actuating circuit for coupling a valve for speed regulation, (c) an advance circuit electrically coupled to said vacuum solenoid actuating circuit for electrically energizing a magnetizable element for moving said valve, (d) a solenoid holding circuit connected to said vacuum solenoid actuating circuit, and (e) a one-way current passing means disposed between said solenoid holding circuit and said advance circuit to prevent feedback to said advance solenoid circuit.

9. A speed regulating system including; (a) servo motor means for controlling engine throttle setting, (b) pressure source means for supplying a first fluidic pressure to said servo motor means, (c) solenoid valve means for opening and closing against said pressure supply means to provide or prevent fluid pressure on said servo motor means, (d) modulating valve means for imposing a control pressure on said servo motor, (e) advance means comprising a magnetizable means for moving said modulating valve means to limit the flow of control pressure to said servo motor whereby upon actuation of said advance means said speed regulator system moves said vehicle speed in advancing direction.

10. The combination set out in claim 9 wherein the modulating valve means is moved to a non-pressure supplying position by a pivoted foot means magnetically attracted into abutment with said modulating valve means.

11. The combination set out in claim 9 wherein the modulating valve means is moved to a non-pressure supplying position by a magnetizable element attached thereto and movable by said advance means.

12. A speed control device for controlling the speed of an internal combustion engine comprising, servo motor means responsive to manifold vacuum for controlling the throttle setting of said engine, a conduit for supplying manifold vacuum to said servo motor means, solenoid valve means for porting said conduit to atmospheric pressure, modulating valve means for selectively bleeding air at atmospheric pressure into said conduit, regulator means responsive to the speed of said engine for regulating said modulating valve means, coupling means for selectively coupling said regulator means to said modulating valve means, first actuating circuit means for closing said solenoid valve means to restrict atmospheric pressure from said conduit, holding circuit means for maintaining said solenoid valve means in said closed position, coupling circuit means for actuating said coupling means to couple said regulator means to said modulating valve means, second actuating circuit means including a coil for moving said modulating valve means to a closed position, said second actuating circuit electrically connected to said first actuating circuit means for simultaneous actuation therewith, a diode in said first actuating circuit means to prevent feedback to said second actuating circuit means when said holding circuit means is actuated, and a multi-position switch for alternately connecting said coupling circuit means or said first and second circuit actuating means to a power source.

13. The speed control device of claim 12, wherein said coupling circuit means and said holding circuit means are electrically connected for simultaneous actuation.

14. The speed control device of claim 12, wherein said coupling circuit means and said holding circuit means are electrically connected for simultaneous actuation.

15. The speed control device of claim 12, where a low-speed switch is interposed in the circuitry of said first and second actuating circuit means.

16. The speed control device of claim 12, wherein said coupling circuit means is automatically rendered inoperative on actuation of said second actuating circuit means.

17. A speed control device for controlling the speed of a vehicle having an internal combustion engine comprising, a vacuum actuated bellows operatively attached to the throttle linkage of said engine, a conduit for supplying manifold vacuum to said bellows, a solenoid operated valve adapted to open and close said conduit to the atmosphere, a modulating valve having a variable orifice for bleeding air at atmospheric pressure into said conduit, regulator means responsive to the speed of said vehicle for varying said orifice, coupling means for selectively coupling said regulator means to said modulating valve, a first actuating circuit for closing said solenoid operated valve to close said conduit to the atmosphere, a holding circuit for maintaining said solenoid operated valve in a closed position, an electrically operative coil adapted to close said modulating valve, a second actuating circuit for activating said coil to close said modulating valve, said first and second actuating circuits being electrically connected for simultaneous operation, a diode in said first actuating circuit to prevent electrical feedback to said second actuating circuit when said holding circuit is activated, and a multi-position switch for alternately connecting said coupling circuit or said first and second actuating circuits to a power source.

18. The speed control device of claim 17, wherein said holding circuit is automatically actuated on the closing of said solenoid operated valve.

19. The speed control device of claim 17, wherein said coupling circuit and said holding circuit are electrically connected for simultaneous operation.

20. The speed control device of claim 19, wherein said coupling and holding circuits are automatically inactivated on activation of said coil to close said modulating valve.

References Cited
UNITED STATES PATENTS

| | | | |
|---|---|---|---|
| 2,870,892 | 1/1959 | Hiner | 192—3UX |
| 3,183,993 | 5/1965 | Parker et al. | 123—103X |
| 3,195,672 | 7/1965 | Brennan | 123—103X |
| 3,207,252 | 9/1965 | Cripe et al. | 180—108 |
| 3,291,246 | 12/1966 | Colling et al. | 123—102X |
| 3,298,482 | 1/1967 | Mueller et al. | 123—102X |
| 3,340,952 | 9/1967 | Day | 180—108 |
| 3,353,619 | 11/1967 | Lambert | 123—102X |
| 3,410,361 | 11/1968 | Marie | 180—108 |
| 3,504,754 | 4/1970 | Marie | 180—108 |

KENNETH H. BETTS, Primary Examiner